United States Patent
Duckett et al.

(10) Patent No.: US 11,830,388 B2
(45) Date of Patent: *Nov. 28, 2023

(54) PRINTED TAGS FOR HEATED FOOD ITEMS

(71) Applicant: Avery Dennison Retail Information Services, LLC, Mentor, OH (US)

(72) Inventors: Jeanne F. Duckett, Franklin, OH (US); Stephen John Walker, Baulkham Hills (AU); Karen L Euse, Miamisburg, OH (US); Jayne Blair, Miamisburg, OH (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/170,980

(22) Filed: Feb. 9, 2021

(65) Prior Publication Data
US 2021/0166585 A1 Jun. 3, 2021

Related U.S. Application Data

(62) Division of application No. 14/875,976, filed on Oct. 6, 2015.

(51) Int. Cl.
*G09F 3/02* (2006.01)
*G06K 19/06* (2006.01)
(Continued)

(52) U.S. Cl.
CPC ......... *G09F 3/02* (2013.01); *G06K 19/06046* (2013.01); *G06Q 10/087* (2013.01);
(Continued)

(58) Field of Classification Search
CPC ...... G09F 3/02; G09F 3/10; G09F 2003/0201; G09F 2003/0216; G09F 2003/022;
(Continued)

(56) References Cited

U.S. PATENT DOCUMENTS 1,475,958 A    12/1923   Marsh et al.
4,698,929 A * 10/1987   Fast .................. G09F 3/04
                                             40/642.01
(Continued)

FOREIGN PATENT DOCUMENTS

CN    102542341    7/2012
CN    102609755    7/2012
(Continued)

OTHER PUBLICATIONS

International Search Report and Written Opinion dated Jun. 9, 2016 issued in corresponding IA No. PCT/US2015/054178 filed Oct. 6, 2015.

(Continued)

*Primary Examiner* — Florian M Zeender
*Assistant Examiner* — Karma A El-Chanti (57) ABSTRACT

Systems and methods are provided for creating printed tags for use in connection with a heated food item placed into a hot holding unit. System components may include a user interface, a printer, and a controller. The controller is programmed to instruct the user interface to display a prompt for an operator to input information identifying one or more characteristics of a food item positioned within or to be placed into a hot holding unit. The controller receives the information from the user interface and instructs the printer to generate a tag identifying the food item and the time at which the food item is to be removed from the hot holding unit and discarded. The tag may include a display area to display the printed information and a support area with a slit that allows the tag to be supported by a rack of the hot holding unit.

7 Claims, 8 Drawing Sheets

(51) Int. Cl.
  *G09F 3/10* (2006.01)
  *G06Q 50/12* (2012.01)
  *G06Q 10/087* (2023.01)
  *B41J 3/407* (2006.01)
  *B41J 2/32* (2006.01)

(52) U.S. Cl.
  CPC ............... *G06Q 50/12* (2013.01); *G09F 3/10* (2013.01); *B41J 2/32* (2013.01); *B41J 3/407* (2013.01); *G09F 2003/0201* (2013.01); *G09F 2003/022* (2013.01); *G09F 2003/0216* (2013.01)

(58) Field of Classification Search
  CPC ........... G06K 19/06046; G06Q 10/087; G06Q 50/12; B41J 2/32; B41J 3/407
  See application file for complete search history.

(56) References Cited

U.S. PATENT DOCUMENTS

| | | | |
|---|---|---|---|
| 4,760,660 A | 8/1988 | Fast | |
| 4,869,007 A * | 9/1989 | Fast | G09F 1/10 40/664 |
| 5,664,669 A | 9/1997 | VanFleet | |
| 2003/0006281 A1 * | 1/2003 | Thomas | G07G 1/0045 705/28 |
| 2005/0211775 A1 * | 9/2005 | Vaseloff | G06Q 10/087 340/5.92 |
| 2007/0035383 A1 * | 2/2007 | Roemerman | G06K 7/0008 340/505 |
| 2007/0251521 A1 | 11/2007 | Schackmuth et al. | |
| 2009/0190987 A1 | 7/2009 | Vleurinck et al. | |
| 2009/0258116 A1 | 10/2009 | Peyton et al. | |
| 2010/0274633 A1 | 10/2010 | Scrivano et al. | |
| 2011/0318080 A1 | 12/2011 | Hatanaka et al. | |
| 2013/0006415 A1 * | 1/2013 | Paydar | G07F 17/0092 700/235 |
| 2013/0183423 A1 * | 7/2013 | Todys | A47J 39/00 426/418 |
| 2014/0204401 A1 | 7/2014 | Salerno | |
| 2014/0244526 A1 | 8/2014 | Georges et al. | |
| 2015/0152273 A1 | 6/2015 | Caillier et al. | |
| 2016/0267816 A1 | 9/2016 | Anderson et al. | |
| 2016/0328190 A1 | 11/2016 | Platts | |
| 2017/0063924 A1 * | 3/2017 | Dick | G06F 3/14 |
| 2021/0335476 A1 * | 10/2021 | Farrar | A61B 5/1118 |

FOREIGN PATENT DOCUMENTS

| | | |
|---|---|---|
| JP | 2002-196672 | 7/2002 |
| JP | 2010-086287 | 4/2010 |
| JP | 2010-140214 | 6/2010 |
| KR | 20110049181 | 5/2011 |
| WO | 88/05585 | 7/1988 |
| WO | 03/034329 | 4/2003 |

OTHER PUBLICATIONS

International Preliminary Report on Patentability dated Apr. 10, 2018 issued in corresponding IA No. PCT/US2015/054178 filed Oct. 6, 2015.

* cited by examiner

```
Print Date
Log Discard Date
Event Description
Hot Holding
Store Number
GLN
Date / Time
Oven Number
Sequential Number
Lot Number
```
— 1001

```
<?xml version="1.0" encoding="UTF-8" standalone="true"?>
<ns6:EPCISDocument creationDate="2015-07-15T15:46:56.574Z"
schemaVersion="1.1" xmlns:ns6="urn:epcglobal:epcis:xsd:1"
xmlns:ns5="urn:epcglobal:epcis-masterdata:xsd:1"
xmlns:ns4="http://schemas.xmlsoap.org/soap/envelope/"
xmlns:ns3="urn:epcglobal:epcis-query:xsd:1"
xmlns:ns2="http://www.unece.org/cefact/namespaces/StandardBusinessDocumne
ntHeader"><EPCISBody><EventList><ObjectEvent><eventTime>2015-07-
15T00:00:00.000-04:00</eventTime><recordTime>2015-07-15T00:00:00.000-
04:00</recordTime><eventTimeZoneOffset>-
04:00</eventTimeZoneOffset><epcList><epc>urn:epc:id:sgtin:2345678.190123.11
111</epc></epc><action>ADD</action><bizStep>urn:epcglobal:cbv:bizstep:ot
her<bizStep><disposition>on_progress</disposition><readPoint><id>urn:epc:id:sgt
in:1234567.89013.11</id><readPoint><bizLocation><id>urn:epc:id:sgtin:1234567.8
9013.11</id></bizlocation></ObjectEvent></EventList><EPCISBody></ns6:EPC
ISDocument>
```
— 1005

Hot Holding — 1101
Chicken — 1105
Operator 123 — 1110
UOM - Each — 1115
Count - 3 — 1120
ID 991234 — 1125

Printed July 15, 2015 — 1135
Discard Oct 15, 2015 — 1140

FIG. 11

PRINTED TAGS FOR HEATED FOOD ITEMS

CROSS-REFERENCE TO RELATED APPLICATION

The present application is a division of U.S. patent application Ser. No. 14/875,976 filed Oct. 6, 2015, which is incorporated herein by reference in its entirety.

BACKGROUND

Field of the Disclosure

The present subject matter relates to the service of heated food items. More particularly, the present subject matter relates to printed tags used to identify the time at which a heated food item was prepared.

Description of Related Art

This invention relates to identification of in-process hot food holding. Per governmental regulation, all potentially hazardous foods, except for those prepared for immediate consumption by a patron, shall be maintained in such a fashion as to prevent the growth or development of bacteria. Per USDA regulations, hot holding equipment must be able to keep foods at a temperature of 140° F. (60° C.) or higher. After up to 4 hours at this temperature, the food must be discarded.

In order to track when a food item was placed into holding, Food Safety Standard Operating Procedures have recommended developing a colored tag indicating when the item was prepared. For example, mashed potatoes prepared at 8:00 am have a blue hard tag hung on the oven rack. Best practices would also call for a wall chart indicating the meaning of the different colors. All employees must be trained in the practice of properly labeling food placed into hot holding.

Potential disadvantages of such a system include the common practice of discarding food placed into hot storage before the hot holding time limit due to shift changes in order to comply with the Food Safety guidelines. Colored dots or tags also have the limitation of indicating fixed time intervals, thereby requiring the food service personnel to correctly choose the correct one and increasing the potential for wasted food due to disposal prior to the regulated time. Preprinted tags or labels also have these issues. Other limitations include a lack of visible marking of the food service personnel that prepared the food and/or the station at which the food was prepared.

Any detailed information and record keeping is limited to manual recording, which may not be consistently carried out by all personnel. Hand written tags may suffer from illegible written and inaccuracies in data transcribing. Furthermore, these methods can introduce failure points in the creation of Food Service logs of critical tracking point information including business process, time, date, location, personnel, and item.

SUMMARY

There are several aspects of the present subject matter, which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In one aspect, a system and method are provided for tagging food items in a hot holding unit. The system includes and the method provides a user interface, a printer, and a controller associated with the user interface and printer. The controller is programmed to instruct the user interface to display a prompt for an operator to input information identifying one or more characteristics of a food item positioned within or to be placed into a hot holding unit. The controller receives the information from the user interface and instructs the printer to generate a tag identifying the food item and the time at which the food item is to be removed from the hot holding unit and discarded.

In another aspect, there is provided a tag for use in a hot holding unit for storing a heated food item on a rack. The tag includes a perimeter defining a display area and a support area. The display area includes information identifying the food item and the time at which the food item is to be removed from the hot holding unit and discarded. The support area includes at least one slit associated with the perimeter and configured to receive a rod of the rack.

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

To address the disadvantages of known systems, it has been found to be convenient to use on-demand printing for tagging food items in hot holding. In particular, the use of on-demand printing provides for accurate timing of when a food item has been placed into hot holding while decreasing waste or the early disposal of heated food items.

Briefly, a system may be provided to allow food service personnel to enter information regarding any one of a number of applicable operational processes, such as preparation of a heated food item or placement of a heated food item into hot holding. The printer would then create a tag or label format based upon the business process selected (e.g., hot food storage) and, after receiving sufficient information from the operator or elsewhere, produce an on-demand printed tag. The printed tag may then be placed adjacent to the heated food item within a hot holding unit (e.g., supported on a rack of the hot holding unit). An internal electronic log entry or record of the transaction may be generated and stored, with the record containing information regarding the food service personnel, business process, food item, and/or time. The record may be kept in any suitable format (such as EPCIS format) and may be made available via a searchable (including Internet-accessible) storage location.

Figure 1:
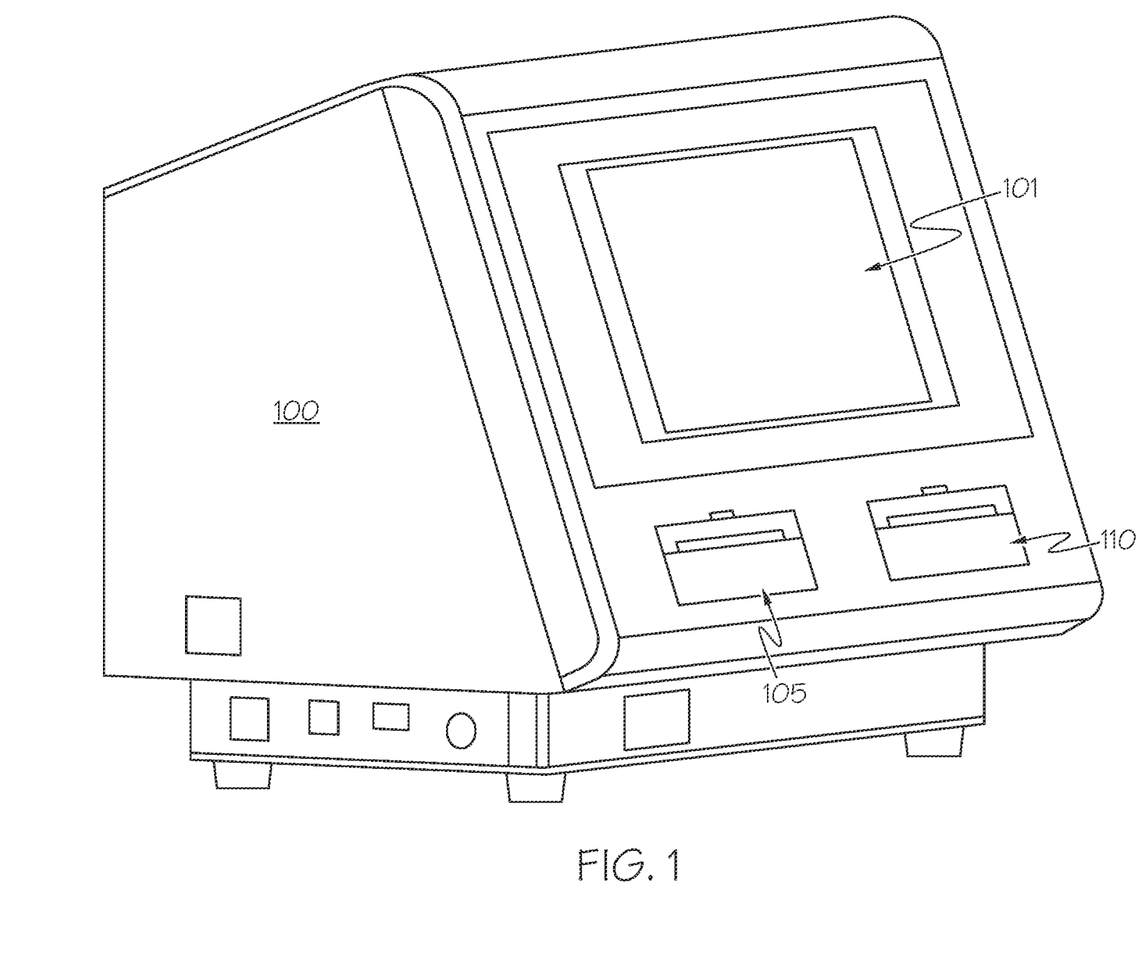
FIG. 1 is a perspective view of components of a system for creating on-demand printed tags for food items in a hot holding unit according to an aspect of the present disclosure.

FIG. 1 shows an exemplary system, generally represented by reference number 100, which may be provided as a thermal printer or, more particularly, as a thermal barcode printer. The system 100 may include any of a number of components, which may have a wide range of functionality. In the illustrated embodiment, the system 100 includes a user interface 101, which allows an operator to interact with the system 100. In one embodiment, the user interface 101 is a touchscreen, but it is also within the scope of the present disclosure for the user interface 101 to be differently configured (e.g., by comprising a screen that displays prompts to an operator, with one or more associated buttons and/or a keyboard or mouse that allows the operator to input information and commands). The illustrated system 100 also includes a printer 105, where on-demand printed tags created by the system 100 are printed and made accessible to an operator. The illustrated system 100 also includes a second printer 110 that may be loaded with receipt paper (which is not necessarily configured for placement into a hot holding unit) for printing a smart log for record retention. The system 100 also includes a controller (not illustrated), such as a microprocessor, that is associated with the other components of the system 100. The system 100 receives data or information (e.g., receiving the information entered by an operator using the user interface 101) and issues commands (e.g., instructing the printer 105 to generate an on-demand printed tag) to the other components of the system 100.

Figure 2:
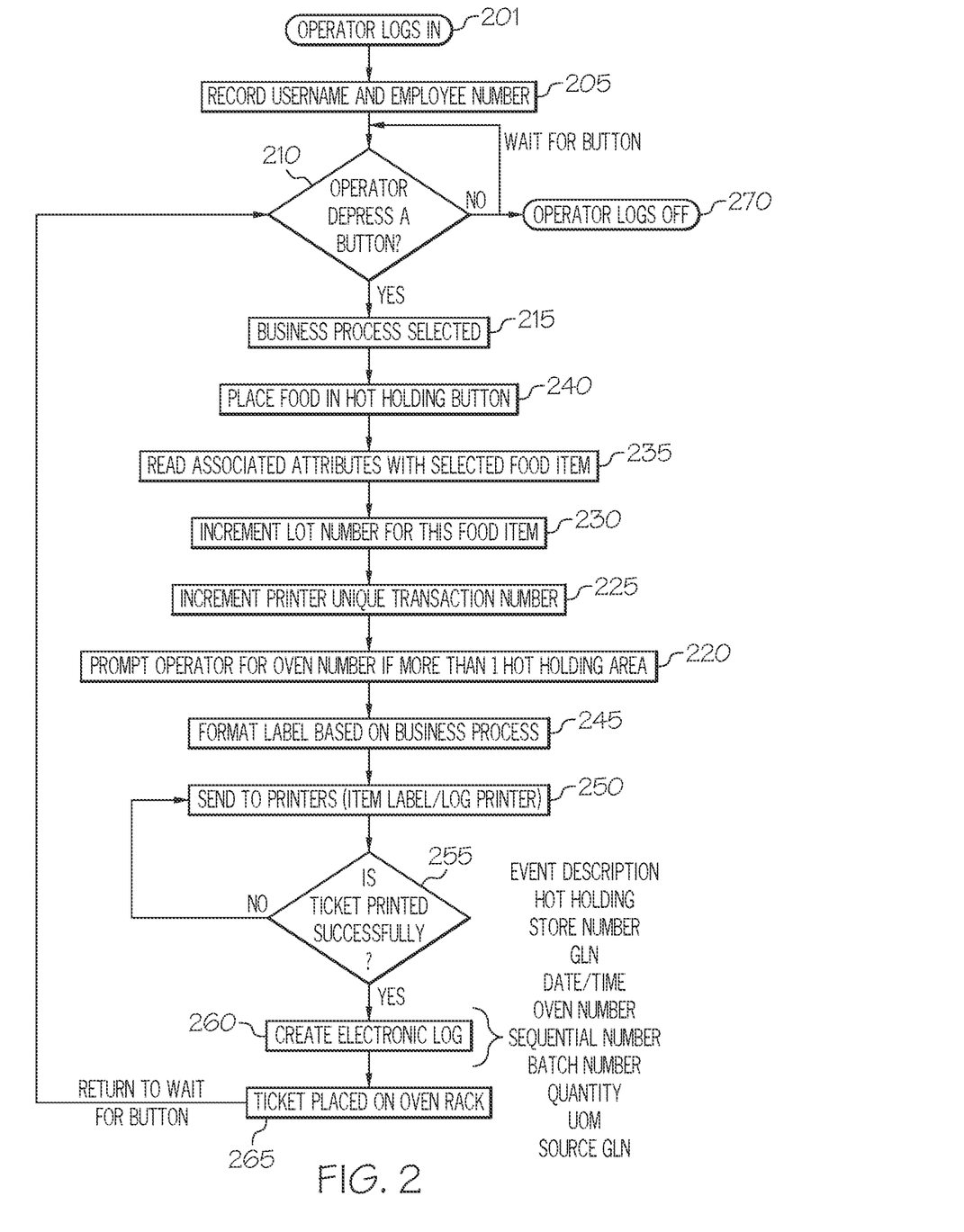
FIG. 2 is a diagrammatic flow chart illustrating an embodiment using the system and method of the disclosure to create a printed tag.
Figure 3:
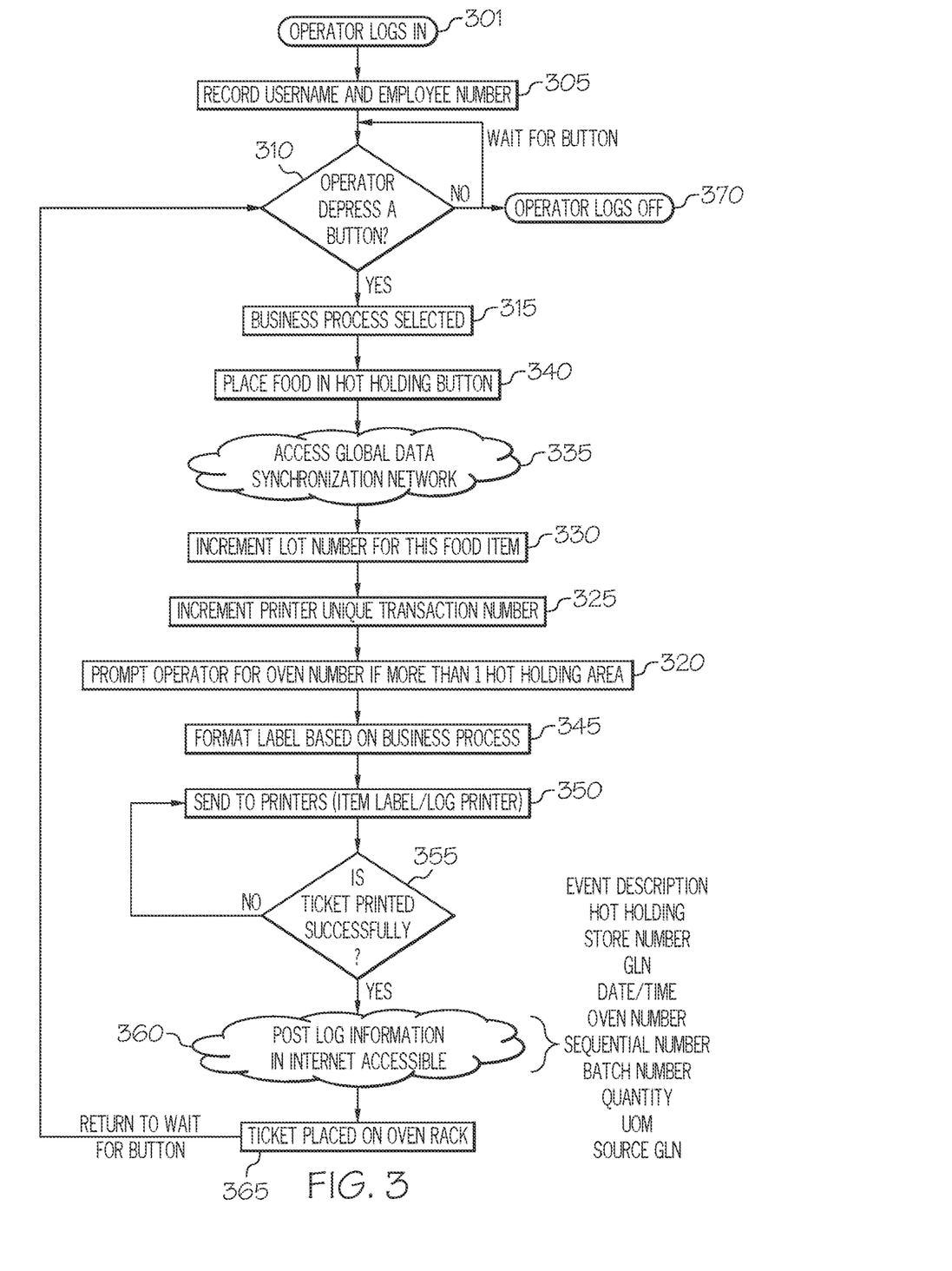
FIG. 3 is a diagrammatic flow chart illustrating another embodiment using the system and method of the disclosure to create a printed tag.
Figure 4:
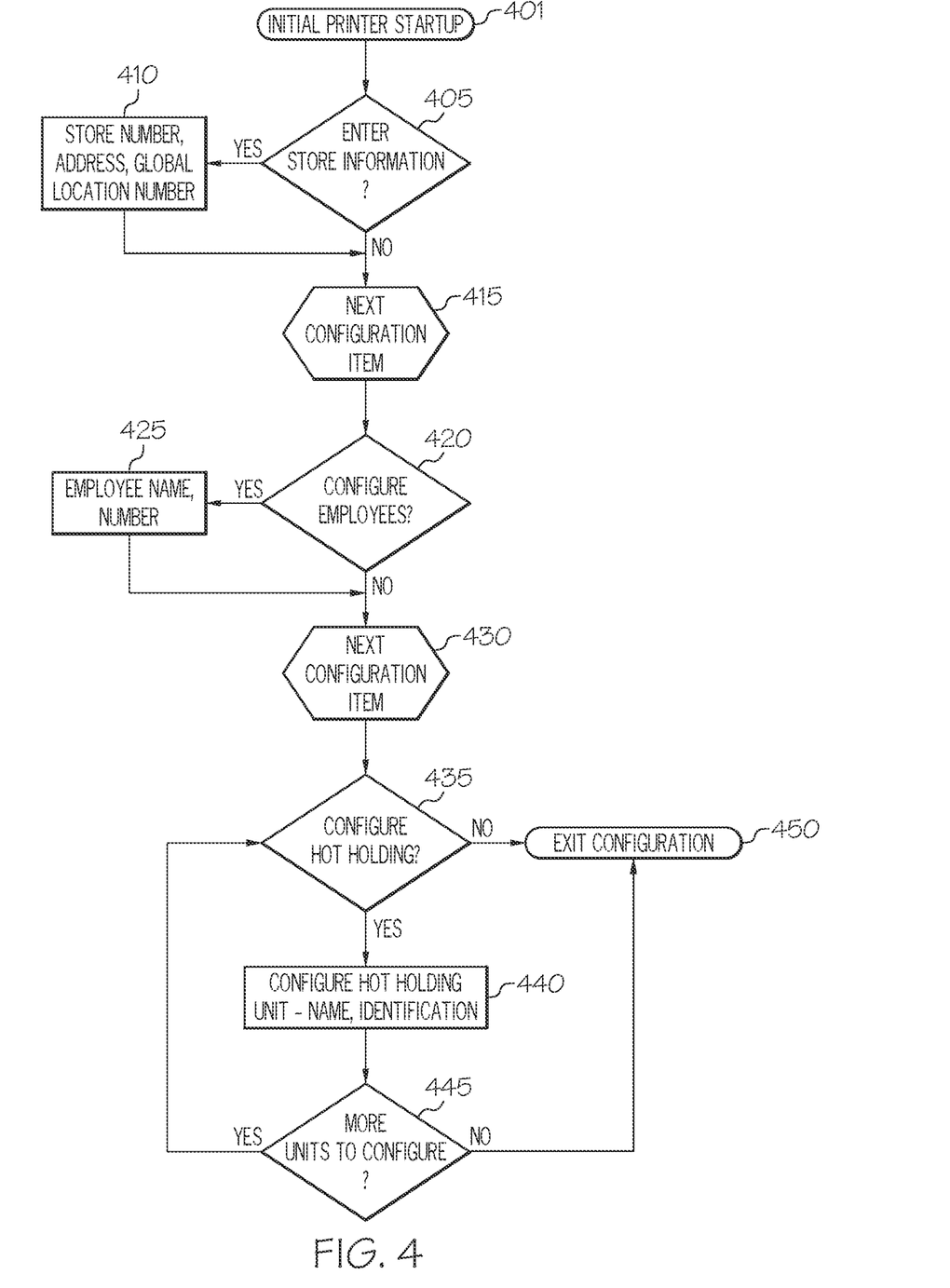
FIG. 4 is a diagrammatic flow chart of initially configuring the system and method of the disclosure for use at a food preparation facility.

FIGS. 2 and 3 illustrate two exemplary methods carried out by a system 100 according to the present disclosure may be used, while FIG. 4 illustrates an exemplary method by which such a system 100 may be initially configured for use at a food preparation facility. It should be understood that the illustrated methods are merely exemplary and that the order of operations may be varied, selected steps may be omitted, and/or additional steps may be included without departing from the scope of the present disclosure. Also, it should be understood that two or more steps may be carried out simultaneously, rather than the steps being performed sequentially.

According to the method illustrated in FIG. 2, an operator begins at 201 by logging in, which may involve entering his or her name and/or an identification number or providing some other form of identification (e.g., a thumbprint or similar biometric identifier or an identification card with a barcode or similar machine-readable portion) using the user interface 101. This data entry may be encouraged by a prompt appearing on the user interface 101. It is also within the scope of the present disclosure for an operator to initiate the creation of an on-demand printed tag without logging in, although it may be advantageous to verify that the system 100 is being used by a properly authorized individual.

In the illustrated embodiment, the operator enters his or her name and/or employee number, which may be recorded and retained by the system controller, as at 205. The system and method then waits for the user to interact with the user interface 101, such as by depressing a button or an icon to select a business process (e.g., preparation of a heated food item or placement of a heated food item into hot holding), as shown at 210 and 215. FIG. 2 shows the operator selecting a "place food in hot holding" operational process by depressing a button associated with the user interface 101 at 240.

After selecting the operational process, the system and method proceed to obtain information about the food item, as at 235. This information may be obtained from an item database that is accessed by the system controller after the operator enters basic information about the food item (e.g., the name of the food item or a code number or some other identifying characteristic, etc.) using the user interface 101, although it is also within the scope of the present information for the selected operational process to include the necessary basic information about the food item (e.g., "place fried chicken in hot holding" or "place small mashed potatoes in hot holding"). The system and method may prompt the operator to enter the time at which the food item was placed into hot holding or may otherwise estimate the time at which the food item was placed into hot holding (e.g., assuming that the food item was placed into hot holding at approximately the time at which the operator initiated the tag-creation process at step 201). The information obtained about the food item may vary without departing from the scope of the present disclosure. For example, the controller may obtain information regarding the number of times that the same item that has been prepared that day (e.g., determining that the fifth order of small mashed potatoes has been prepared).

A batch number is created at 230, which refers to the number of times that the particular heated food item has been prepared. This may be stored in non-volatile memory and be increased from 1 to an upper value (e.g., 999) before rolling back over to 1. A transaction number may also be created (as at 225), which may be a combination of the last six digits of the device MAC address and an eight-digit non-volatile number that will roll over when incremented from 99999999 to 00000001, for example. These numbers may be stored by the system controller in a database or other electronic storage location.

If the food preparation facility includes more than one hot holding unit, then the system and method may prompt the operator to enter the identity (e.g., an identifying number) of the hot holding unit into which the food item has been placed, as at 220.

Figure 5:
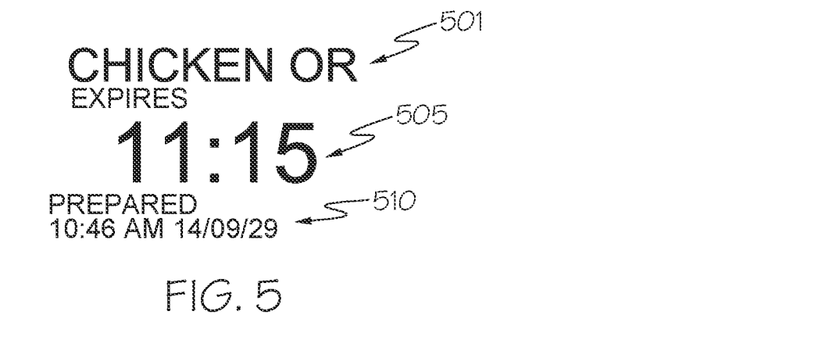
FIG. 5, FIG. 6 and FIG. 7 each illustrate an exemplary format for a printed tag created by the system and method of the disclosure.

The system controller is programmed with various tag formats, which correspond to the particular operational process that is selected at 215. FIG. 5 shows an exemplary tag format that is used by the system controller (at 245) when the "hot holding" process is selected (at 215 and 240). It should be understood that the tag format may vary without departing from the scope of the present disclosure, but in the illustrated embodiment, the tag format includes a food item description at 501, the time at which the food item is to be removed from hot holding and discarded at 505, and the date and time at which the food item entered the hot holding unit at 510.

Figure 6:
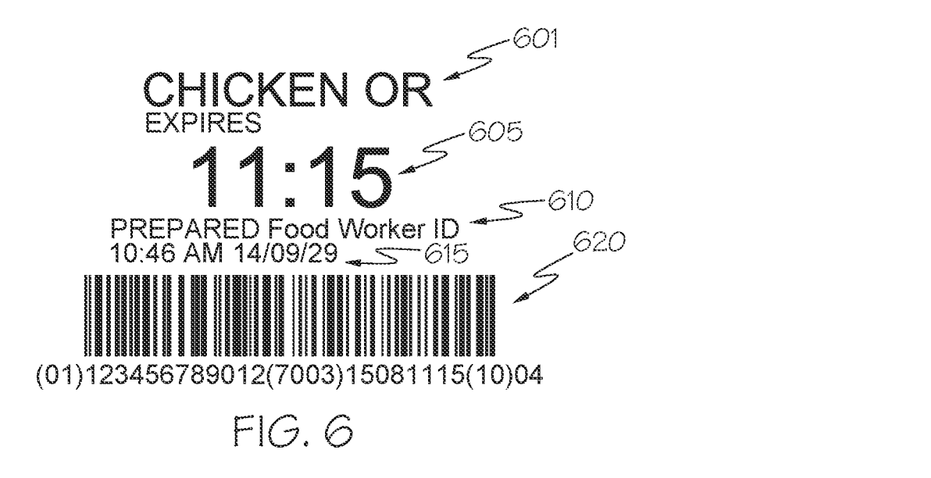
Figure 7:
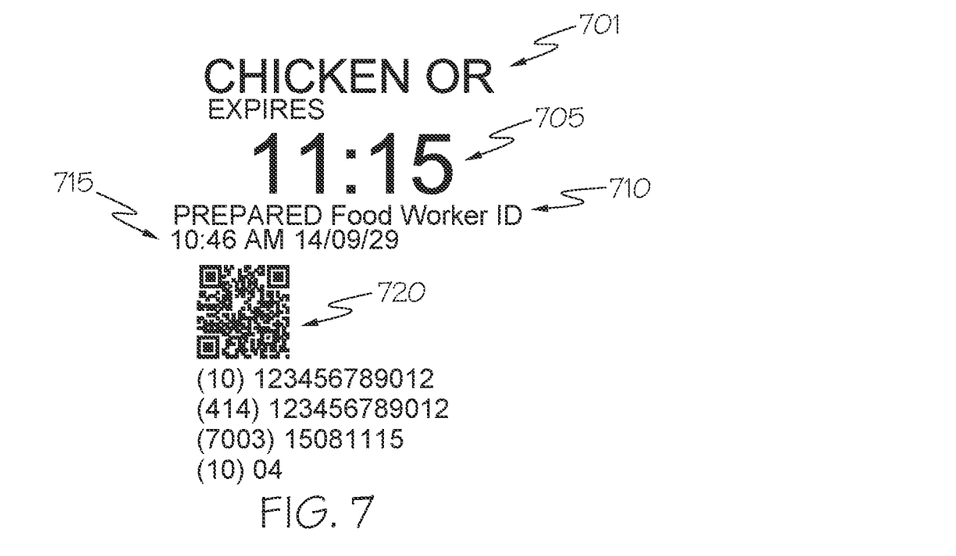

Other possible tag formats are shown in FIGS. 6 and 7, which are possible if the system 100 is configured to generate barcodes or other readable codes including an electronic beacon or RFID inlay. In the embodiment of FIG. 6, the tag format includes a food item description at 601, the time at which the food item is to be removed from hot holding and discarded at 605, information regarding the individual that prepared the food item at 610 (e.g., an employee number), the date and time at which the food item entered the hot holding unit at 615, and a GS1 barcode at 620. The barcode may include application identifiers referencing any information, such as the item GTIN, expiration date and time, and/or batch number.

The tag format of FIG. 7 is similar to FIG. 6, with a food item description at 701, the time at which the food item is to be removed from hot holding and discarded at 705, information regarding the individual that prepared the food item at 710 (e.g., an employee number), the date and time at which the food item entered the hot holding unit at 715, and a barcode at 720. The tag format of FIG. 7 differs from the tag format of FIG. 6 because the barcode 720 is provided as a datamatrix barcode. Similar to the barcode 620 of FIG. 6, the barcode 720 of FIG. 7 may include any of a variety of information, such as the GITN, global location number of the food preparation facility, the date and time at which the food item must be removed from hot holding, and the unique batch/item number.

Figure 8:
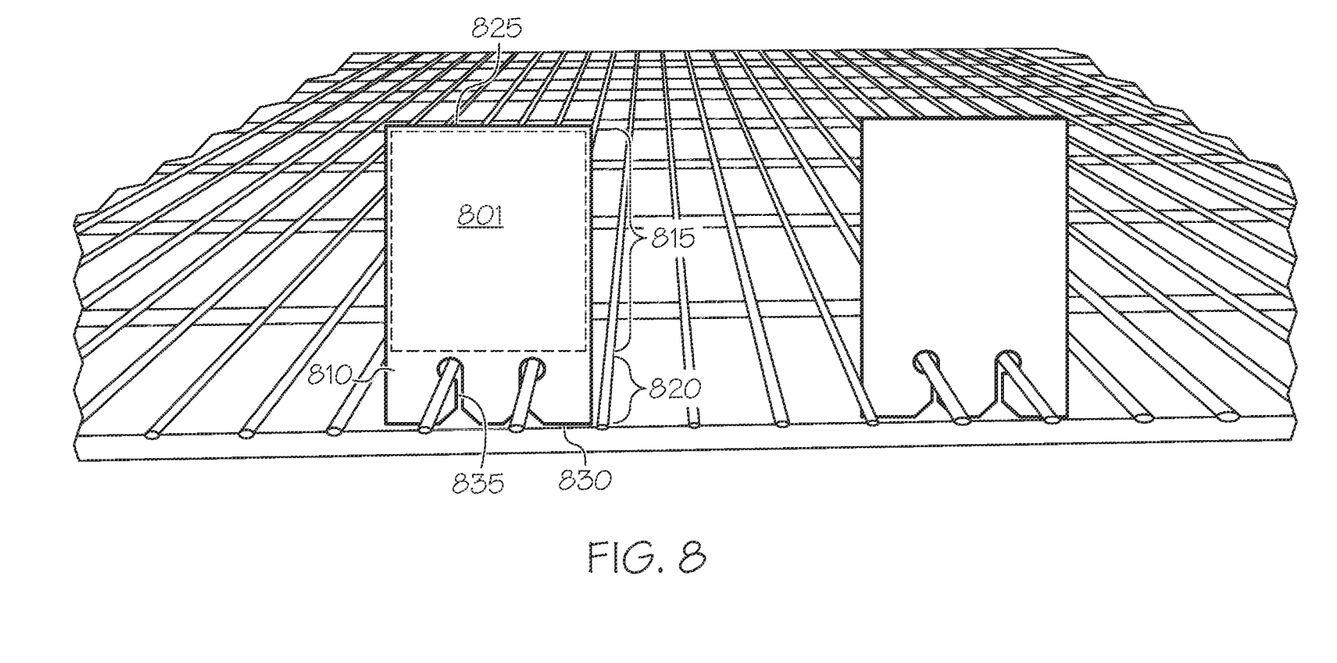
FIG. 8 is a perspective view of an example of a printed tag created by the system and method of the disclosure, supported by the rack of a hot holding unit.
Figure 9:
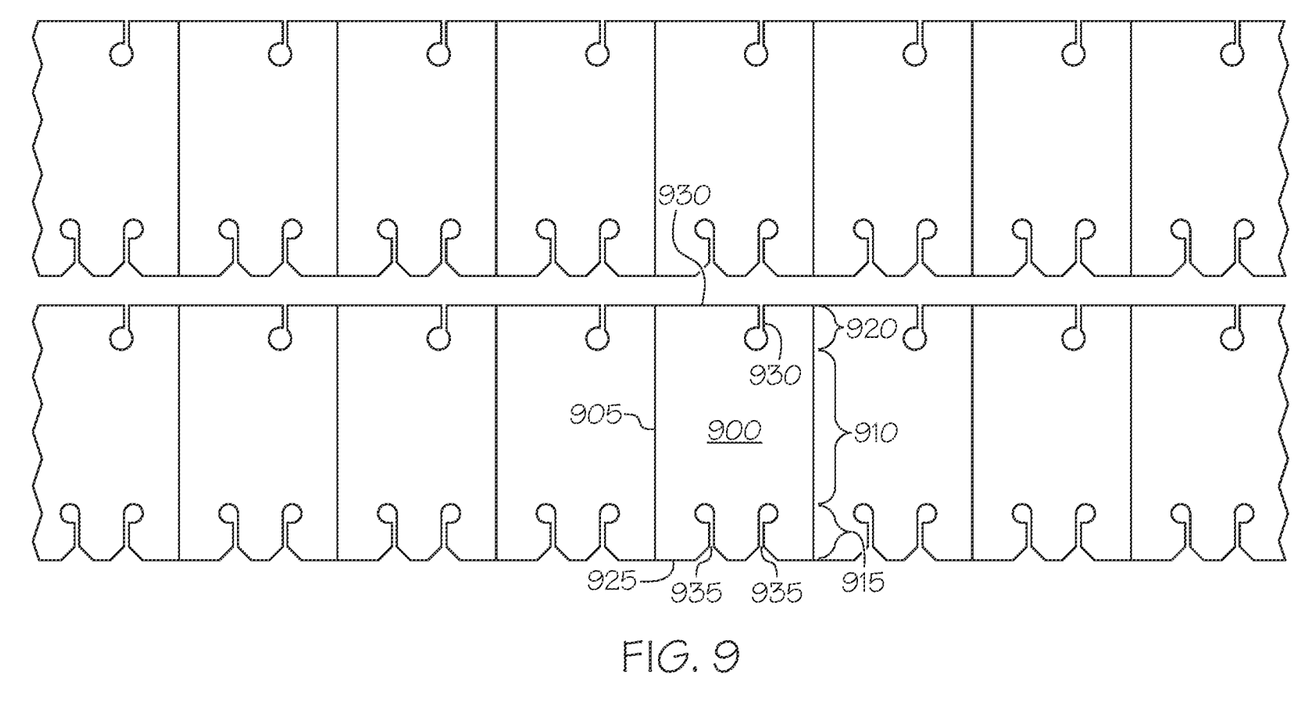
FIG. 9 is front elevational view of a sheet of tags for use by the system and method of the disclosure.
Figure 10:
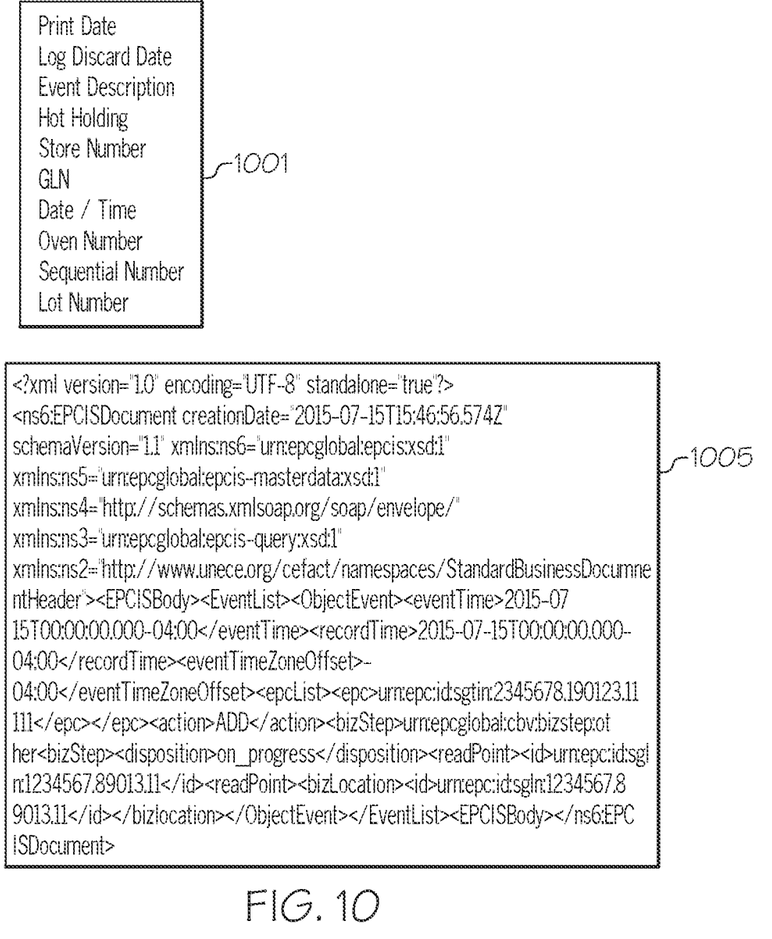
FIG. 10 illustrates an exemplary format of an electronic log entry generated by the system and method of the disclosure.
Figure 11:
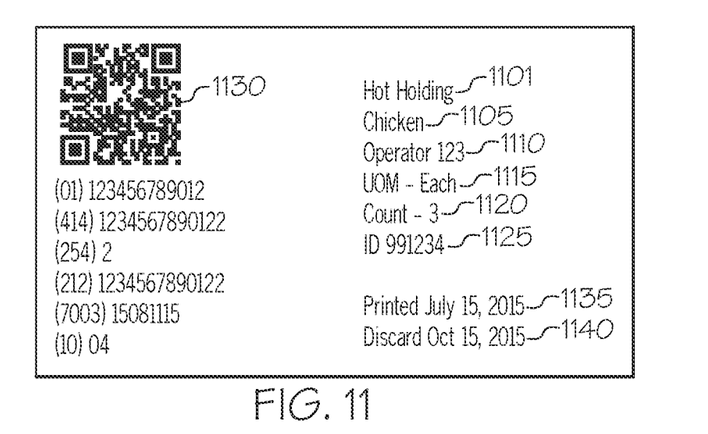
FIG. 11 illustrates an exemplary format of a printed log file generated by the system and method of the disclosure.

With the proper tag format selected, the log information and the hot holding tag or ticket are sent to the printer 105 (at 250). FIGS. 8 and 9 show the general shape that an on-demand printed tag may take, while FIGS. 10 and 11 show exemplary formats for an electronic log entry and printed log file (respectively), although it should be understood that printed tags, electronic log entries, and printed log files according to the present disclosure may be differently configured without departing from the scope of the present disclosure. The on-demand printed tags, electronic log entries, and printed log files will be described in greater detail herein.

If there is an error in sending the log information and hot holding tag or ticket to the printer 105 (which is checked at 255), then the process will proceed back to 250 and resend the data. On the other hand, if there is no error, then the process continues to 260, where the electronic log information is created and stored in a local database or similar memory location by the system controller. As shown in FIG. 2, the electronic log information may include: a description of the event (e.g., the date and time the food item went into the hot holding unit, the Global Location Number and/or store number, the identity of the hot holding unit used, and the unique batch/item and transaction numbers). The electronic log may include additional or alternative entries as well.

With the hot holding tag successfully created, a prompt may appear on the user interface 101 to tell the operator to place the hot holding tag or ticket in the hot holding unit (at 265). FIG. 8 shows one way in which an on-demand printed tag may be secured in place within a hot holding unit, although there are other ways in which the tag may be positioned within a hot holding unit, as will be described below.

The system and method may then return to 210 to wait for another button depress or similar interaction of the operator with the user interface 101. If the operator selects to exit or end the process rather than creating another on-demand printed tag, then the process terminates at 270.

FIG. 3 illustrates tag-creation process that is similar to the process of FIG. 2, with the steps of FIG. 3 having a "3" leading numeral corresponding to the steps of FIG. 2 having a "2" leading numeral (e.g., steps 301 and 345 of FIG. 3 corresponding to steps 201 and 245 of FIG. 2, respectively) and the above description, unless otherwise noted. In particular, the process of FIG. 3 differs from the process of FIG. 2 at 335 and 360, which differ from the corresponding steps 235 and 260 of FIG. 2. At 335, the controller reads the item attributes associated with the heated food item from the Global Data Synchronization network and then compares the item information to the data in the item database, rather than only obtaining the information from the item database, as in 235 of FIG. 2. At 360, the electronic log information is posted in a remote location (which may be Internet-accessible), rather than being stored locally, as in 260 of FIG. 2. The tag format used in the process of FIG. 3 may be the same as in FIG. 2 (e.g., one of the formats shown in FIGS. 5-7) or may be different if additional information is obtained at 335 compared to 235.

FIG. 4 shows an exemplary process for initially configuring the system for use at a food preparation facility. The process begins at 401, where the system is powered on and enters into a startup routine or protocol. At 405, the user is prompted to enter the store/facility information. If the user chooses to enter such information, then the process proceeds to 410, with the user entering the requested information (e.g., store number and name, address, and/or Global Location Number); otherwise, the process proceeds to 415 in preparation for the next configuration item.

In 420 the user is prompted to enter employee information. The user can enter the employee name and employee number or the system and method can assign a sequential employee number based off of a unique combination with the MAC address of the unit. The user can continue to enter as many employees as desired until indicating to the system 100 that there are no additional employees to be added, at which time the process proceeds to 430 in preparation for the next configuration item.

At 435, the user is prompted for configuration of the hot holding unit(s). If the user does not want to configure the hot holding unit(s) they exit the process at 450; otherwise, the user may enter the hot holding unit name and/or number at 440, with additional units being added (at 445) until the user chooses to exit the setup routine at 450.

Turning back now to the on-demand printed tag 801 created by the system and method, FIG. 8 shows one way in which the tag 801 may be positioned within a hot holding unit, such as an oven. Among the challenges addressed in producing an on-demand tag or label for hot holding is the need for a print/substrate combination that can withstand exposure to 140° F. (or 60° C.) for up to 4 hours. For thermal direct printing, it may be advantageous to use substrates and printing inks or toners that are formulated for extended-time elevated-temperature uses, or comparable materials suitable for creating an on-demand printed tag 801 capable of being mounted from and displayed within a hot holding unit rack, oven and/or heating unit.

As shown in FIG. 8, the tag 801 may be oriented substantially vertically for clear visibility from a position outside of the hot holding unit. In the illustrated embodiment, the tag 801 is substantially rectangular, with a perimeter 810 defining a display area 815 (onto which the tag format of FIGS. 5-7 or the like may be printed) and at least one support area 820 (to support the tag 801 on the rack). In the embodiment of FIG. 8, the display area 815 is associated with an upper edge 825 and center of the tag 801, while the single support area 820 is associated with the lower edge 830 of the tag 801. In other embodiments, the tag may be differently configured without departing from the scope of the present disclosure.

The support area 820 includes at least one rod-receiving formation or slit 835, which is associated with and opens at the perimeter 810 (at the lower edge 830 in FIG. 8). The slit 835 receives a rod of the rack of the hot holding unit to secure the tag 801 in place with respect to the rack. In the illustrated embodiment, with the slit 835 associated with the lower edge 830 of the tag 801, the tag 801 may be pressed down toward the rack (with the lower edge 830 pointed downwardly and the upper edge 825 pointed upwardly) to advance a rack rod into the slit 835, such that the tag 801 rests above the rack in a substantially vertical orientation. FIG. 8 shows a tag 801 with a support area 820 having a plurality of slits 835, each associated with the lower edge 830 and receiving a different rack rod. This may be advantageous for improved stability of the tag 801 mounted on the rack, but it is also within the scope of the present disclosure for the support area 820 to have only one slit 835. Additionally, while FIG. 8 shows two substantially identical slits 835, it is also within the scope of the present disclosure for the slits 835 to be differently configured.

FIG. 9 shows a sheet of material from which a plurality of tags 900 may be cut or otherwise formed. FIG. 9 shows all of the tags 900 being substantially identical, but it is within the scope of the present disclosure for differently shaped or configured tags to be used.

In the illustrated embodiment, each tag 900 is substantially rectangular, with a perimeter 905 defining a display area 910 (onto which the tag format of FIGS. 5-7 or the like may be printed) and a pair of support area 915 and 920 (to support the tag 900 on the rack of a hot holding unit). In the embodiment of FIG. 9, the display area 910 is associated with a center section of the tag 900, while one support area 915 is associated with the lower edge 925 of the tag 900 (similar to the support area 820 of FIG. 8) and the other support area 920 is associated with the upper edge 930. In other embodiments, the tag may be differently configured without departing from the scope of the present disclosure, such as having only a single support area associated with the upper end of the tag.

Each support area 915, 920 includes at least one rod-receiving formation or slit 935, which is associated with and opens at the perimeter 905 (at the lower edge 925 for the slits 935 of the lower support area 915 and at the upper edge 930 for the slit 935 of the upper support area 920). All of the slits 935 may be identically shaped, but (as in the illustrated embodiment) it is also within the scope of the present disclosure for two or more of the slits 935 to be differently shaped.

Each slit 935 is configured to receive a rod of the rack of the hot holding unit to secure the tag 900 in place with respect to the rack. Typically, as in the illustrated embodiment, the slit(s) 935 of only one of the support areas 915, 920 is used to mount the tag 900, while the slit(s) 935 of the other support area 915, 920 is not used. However, it is within the scope of the present disclosure for the slits of multiple support areas to be used when mounting the tag within a hot holding unit.

The tags 900 of FIG. 9 may be mounted onto the rack of a hot holding unit in one of two ways. First, the tag 900 may be mounted as in FIG. 8, with the slits 935 of the lower support area 915 receiving rack rods. To so mount a tag 900, the tag 900 may be pressed down toward the rack (with the lower edge 925 pointed downwardly and the upper edge 930 pointed upwardly) to advance a rack rod into the slits 935, such that the tag 900 rests above the rack in a substantially vertical orientation. Alternatively, the tag 900 may be hung below the rack, with the slit 935 of the upper support area 920 receiving a rack rod. To so mount a tag 900, the tag 900 may be pressed upwardly toward the rack (with the lower edge 925 pointed downwardly and the upper edge 930 pointed upwardly) to advance a rack rod into the slit 935, such that the tag 900 hangs below the rack in a substantially vertical orientation. One approach may be preferred to the other to more closely position the tag 900 to the associated food item, depending on where the associated food item is located within the hot holding unit.

FIG. 10 shows two examples of an electronic log file that may be generated by the system 100 for each transaction. Exemplary electronic log file 1001 shows the type of data (e.g., print date, discard date, event description, facility information, etc.) that could be stored in a flat file for collection at the end of the day, while exemplary electronic log file 1005 is the XML posting of the log information to a remote host.

FIG. 11 is an example of the printed log file on receipt paper that could be printed by the second printer 110. In the illustrated example, the printed log file includes an indication 1101 that the transaction involved a Hot Holding business process. The printed log file also includes a food item description at 1105, the operator name and/or employee number at 1110, a unit of measure from the item information 1115, a quantity 1120, a transaction ID 1125, a barcode 1130, the date/time the log was printed at 1135, and the discard date for the log at 1140. The barcode 1130 (which is illustrated as a datamatrix, but may be differently configured) may include any information, such as the item number, GLN number and supplemental number for the oven, GLN source number, the time at which the food had to be discarded from the hot holding unit, and/or the lot number assigned by the unit.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

What is claimed is:

1. A tag generation system for generating a tag for use in a hot holding unit for storing a heated food item on a rack, comprising:
   a thermal unit configured to generate a tag, the thermal unit comprising:
   a user interface;
   a first printer for printing tags;
   a second printer for printing a log for record retention; and
   a controller associated with the user interface, the first printer, and the second printer;
   wherein the user interface, the first printer, the second printer, and the controller of the thermal printer unit are in a single device;

wherein the tag generated by the system comprises a perimeter defining a display area and a support area, wherein the display area includes printed information identifying the heated food item and a time at which the heated food item is to be removed from the hot holding unit and discarded, and the support area includes at least one slit associated with the perimeter and configured to receive a rod of the rack;

wherein the tag generated by the system is configured to withstand temperature up to 140° F. for up to four hours in the hot holding unit;

wherein the perimeter includes a lower edge, and the at least one slit is associated with the lower edge of the perimeter to orient the tag above the rack when the rod is received by the at least one slit.

2. The system of claim 1, wherein the support area includes a plurality of slits associated with the perimeter of the tag, and each slit of the plurality of slits is configured to receive a different rod of the rack.

3. The system of claim 2, wherein the perimeter includes a plurality of edges, and at least two of the plurality of slits are associated with different edges of the perimeter.

4. The system of claim 2, wherein the perimeter includes a plurality of edges, and at least two of the plurality of slits are associated with the same edge of the perimeter.

5. The system of claim 2, wherein at least two of the plurality of slits are differently shaped.

6. The system of claim 1, wherein the support area is configured to orient the tag substantially vertically when the rod is received by the at least one slit.

7. The system of claim 1, wherein the perimeter includes an upper edge, and the at least one slit is associated with the upper edge of the perimeter to orient the tag below the rack when the rod is received by the at least one slit.

* * * * *